United States Patent
Lao et al.

(10) Patent No.: US 12,492,008 B2
(45) Date of Patent: Dec. 9, 2025

(54) COCKPIT VOICE RECORDER DECODER

(71) Applicant: Textron Aviation Inc., Wichita, KS (US)

(72) Inventors: Nathaniel Ryan James Lao, Dallas, TX (US); Jennifer Siviseth, Augusta, KS (US)

(73) Assignee: Textron Innovations Inc., Providence, RI (US)

( * ) Notice: Subject to any disclaimer, the term of this patent is extended or adjusted under 35 U.S.C. 154(b) by 362 days.

(21) Appl. No.: 18/180,329

(22) Filed: Mar. 8, 2023

(65) Prior Publication Data

US 2023/0303266 A1     Sep. 28, 2023

Related U.S. Application Data

(60) Provisional application No. 63/317,747, filed on Mar. 8, 2022.

(51) Int. Cl.
*B64D 45/00*      (2006.01)
*G10L 19/00*      (2013.01)

(52) U.S. Cl.
CPC .............. *B64D 45/00* (2013.01); *G10L 19/00* (2013.01); *B64D 2045/0065* (2013.01)

(58) Field of Classification Search
CPC ............ B64D 45/00; B64D 2045/0065; B64D 704/27
See application file for complete search history.

(56) References Cited

U.S. PATENT DOCUMENTS

| | | | | |
|---|---|---|---|---|
| 5,012,470 A | * | 4/1991 | Shobu | H04N 1/33353 370/464 |
| 5,448,768 A | * | 9/1995 | Zinser | G01S 7/003 455/108 |
| 5,638,066 A | * | 6/1997 | Horiuchi | H03M 7/30 370/476 |
| 5,787,333 A | * | 7/1998 | Rasinski | G09B 9/003 434/4 |
| 6,111,584 A | * | 8/2000 | Murphy | G06T 15/04 345/506 |

(Continued)

OTHER PUBLICATIONS

Interoperability Requirements for ATS Applications Using ARINC 622 Data Communication Document, RTCA SC-189/EUROCAE WG-53 Position Paper, No. PSG1019, Revision D, Oct. 29, 1998.

*Primary Examiner* — Fariba Sirjani
(74) *Attorney, Agent, or Firm* — Avek IP, LLC (57) ABSTRACT

A method for automatically decoding aircraft Cockpit Voice Recorder (CVR) encoded data includes loading a definitions class and a decoder class into a memory via a driver class, loading configuration files into the memory via the definitions class, receiving from an aircraft CVR one or more hex files that include the CVR encoded data into the memory, generating via the decoder class and the configurations file one or more decoded objects based on the one or more hex files, respectively, and displaying the one or more decoded objects in a human readable format. A system to automatically decode aircraft CVR encoded data includes a user interface, a processor, and a memory having a computer program configured to generate one or more decoded objects based on one or more hex files of CVR encoded data, and to display the one or more decoded objects in a human readable format.

19 Claims, 7 Drawing Sheets

(56) References Cited

U.S. PATENT DOCUMENTS

| | | | | |
|---|---|---|---|---|
| 6,128,594 A * | 10/2000 | Gulli | | G10L 15/20 |
| | | | | 704/275 |
| 6,704,361 B2 * | 3/2004 | Bublil | | H04N 19/61 |
| | | | | 375/E7.207 |
| 8,019,337 B2 * | 9/2011 | Galy | | H04L 67/12 |
| | | | | 455/431 |
| 8,156,397 B2 * | 4/2012 | Heiman | | H03M 13/3707 |
| | | | | 370/242 |
| 8,526,940 B1 * | 9/2013 | Chowdhary | | H04W 24/08 |
| | | | | 455/425 |
| 8,618,962 B2 * | 12/2013 | Hellman | | H04N 19/91 |
| | | | | 341/67 |
| 8,666,748 B2 | 3/2014 | Dong et al. | | |
| 10,255,944 B2 * | 4/2019 | Sheng | | G11B 20/1217 |
| 2004/0128039 A1 * | 7/2004 | Podowski | | G08G 5/26 |
| | | | | 701/120 |
| 2005/0114140 A1 * | 5/2005 | Brackett | | G06F 3/167 |
| | | | | 704/E15.002 |
| 2005/0226201 A1 * | 10/2005 | McMillin | | H04L 45/00 |
| | | | | 370/348 |
| 2007/0030899 A1 * | 2/2007 | Iguchi | | H04N 19/51 |
| | | | | 375/E7.262 |
| 2008/0214188 A1 * | 9/2008 | Galy | | H04L 67/12 |
| | | | | 455/431 |
| 2011/0069719 A1 * | 3/2011 | Fries, IV | | H04L 65/60 |
| | | | | 370/463 |
| 2011/0103313 A1 * | 5/2011 | Gorg | | H04W 8/08 |
| | | | | 370/328 |
| 2013/0007557 A1 * | 1/2013 | Yen | | H03M 13/015 |
| | | | | 714/755 |
| 2014/0277923 A1 * | 9/2014 | Kaufmann | | B64D 25/20 |
| | | | | 29/428 |
| 2016/0299506 A1 * | 10/2016 | Bruggeman | | B64D 31/06 |
| 2017/0063944 A1 * | 3/2017 | Nyikos | | H04B 7/18508 |
| 2017/0103751 A1 * | 4/2017 | Du | | G08G 5/26 |
| 2018/0205658 A1 * | 7/2018 | Sullivan | | H04W 4/42 |
| 2020/0334994 A1 * | 10/2020 | Jensen | | B64D 45/00 |
| 2021/0086901 A1 * | 3/2021 | Miller | | H04N 21/2146 |
| 2022/0027762 A1 * | 1/2022 | Leitch | | B64F 5/40 |
| 2022/0038910 A1 * | 2/2022 | Hwang | | H04W 12/66 |
| 2022/0084514 A1 * | 3/2022 | Sampath | | G06F 3/167 |
| 2022/0215765 A1 * | 7/2022 | Gupta | | G08G 5/34 |
| 2022/0388675 A1 * | 12/2022 | Douthitt | | G06F 17/40 |
| 2023/0303266 A1 * | 9/2023 | Lao | | B64D 45/00 |

* cited by examiner

COCKPIT VOICE RECORDER DECODER

CROSS-REFERENCE TO RELATED APPLICATIONS

This application claims the benefit of priority of U.S. Provisional Patent Application No. 63/317,747, entitled Cockpit Voice Recorder Decoder and filed on Mar. 8, 2022, the disclosure of which is herein incorporated by reference in its entirety.

BACKGROUND

1. Field

Embodiments of the invention relate generally to decoding data, and more specifically to decoding data recorded on a cockpit voice recorder.

2. Related Art

Cockpit Voice Recorder (CVR) decoding is found in the prior art. For example, U.S. Pat. No. 8,019,337 to Galy, et al. discloses an aircraft data transmission for transmitting data between an aircraft and a transmission station, including an encoding/decoding means. U.S. Pat. No. 8,666,748 to Dong, et al. discloses a system for converting audio information which is captured on an airplane.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a processing method configured to automatically decode aircraft Cockpit Voice Recorder (CVR) encoded data includes: loading, via a processor, a definitions class and a decoder class into a memory via a driver class, wherein the memory includes non-transitory computer readable storage medium operatively coupled with the processor; loading configuration files into the memory via the definitions class, wherein the configuration files include a definitions file and an unaligned PER data file; receiving from an aircraft CVR one or more hex files into the memory, wherein the one or more hex files include CVR encoded data; generating via the decoder class and the configurations file one or more decoded objects based on the one or more hex files, respectively; and displaying, via a user interface operatively coupled with the processor, the one or more decoded objects in a human readable format.

In another embodiment, a processing system configured to automatically decode aircraft Cockpit Voice Recorder (CVR) encoded data includes: a user interface; a processor operatively coupled to the user interface; and a memory operatively coupled to the processor, wherein the memory has a computer program stored thereon, the computer program being configured to decode CVR encoded data via the steps of: loading decoding classes via a driver class, wherein the decoding classes include a definitions class and a decoder class; loading, via the definitions class, configuration files, wherein the configuration files include a definitions file and an unaligned PER data file; receiving one or more hex files including the CVR encoded data; generating, via the decoder class and the configuration files, one or more decoded objects based on the one or more hex files, respectively; and displaying, via the user interface, the one or more decoded objects in a human readable format.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Typically, in avionics, a cockpit voice recorder (CVR) is included in the aircraft and is responsible for recording audio information from one or more microphones located onboard. The recorded cockpit audio provides insight into operation of the aircraft for subsequent investigation and analysis. In order to record such data, the voice recordings may be encoded into a format suitable to decrease the overall data size of the recordings. This encoding allows for substantially longer recordings to take place, allowing for a more detailed investigation or analysis that spans a longer period of time. In some situations, this CVR encoded data is encoded in an unaligned packed encoding rules (PER) format. Historically, decoding unaligned PER encoded CVR data was impossible to perform autonomously. The present invention aims to remedy the aforementioned problems associated with automatically decoding unaligned PER encoded CVR data.

The following are descriptions of implemented classes of an application design. As used herein, "byte" refers to the representation of a single 8-bit byte. As used herein, "data" refers to the representation of a sequence of bytes of an arbitrary length. As used herein, "definition" refers to the representation of decoding definitions. As used herein, "decoder" refers to a class that decodes raw data and generates decoding objects. As used herein, "decoding" refers to a class that stores decoding payload including raw bytes, reference lines, contents, and annotations. As used herein, "driver" refers to a class that handles application operation between the user interface and backend components. As used herein, "session" refers to a class that stores the current user information for an application session. As used herein, "table" refers to a class that handles the table content on the user interface. As used herein, "UI" refers to a class that acts as the user interface for the main window. As used herein, "Util" refers to a class that contains utility methods.

Figure 1:
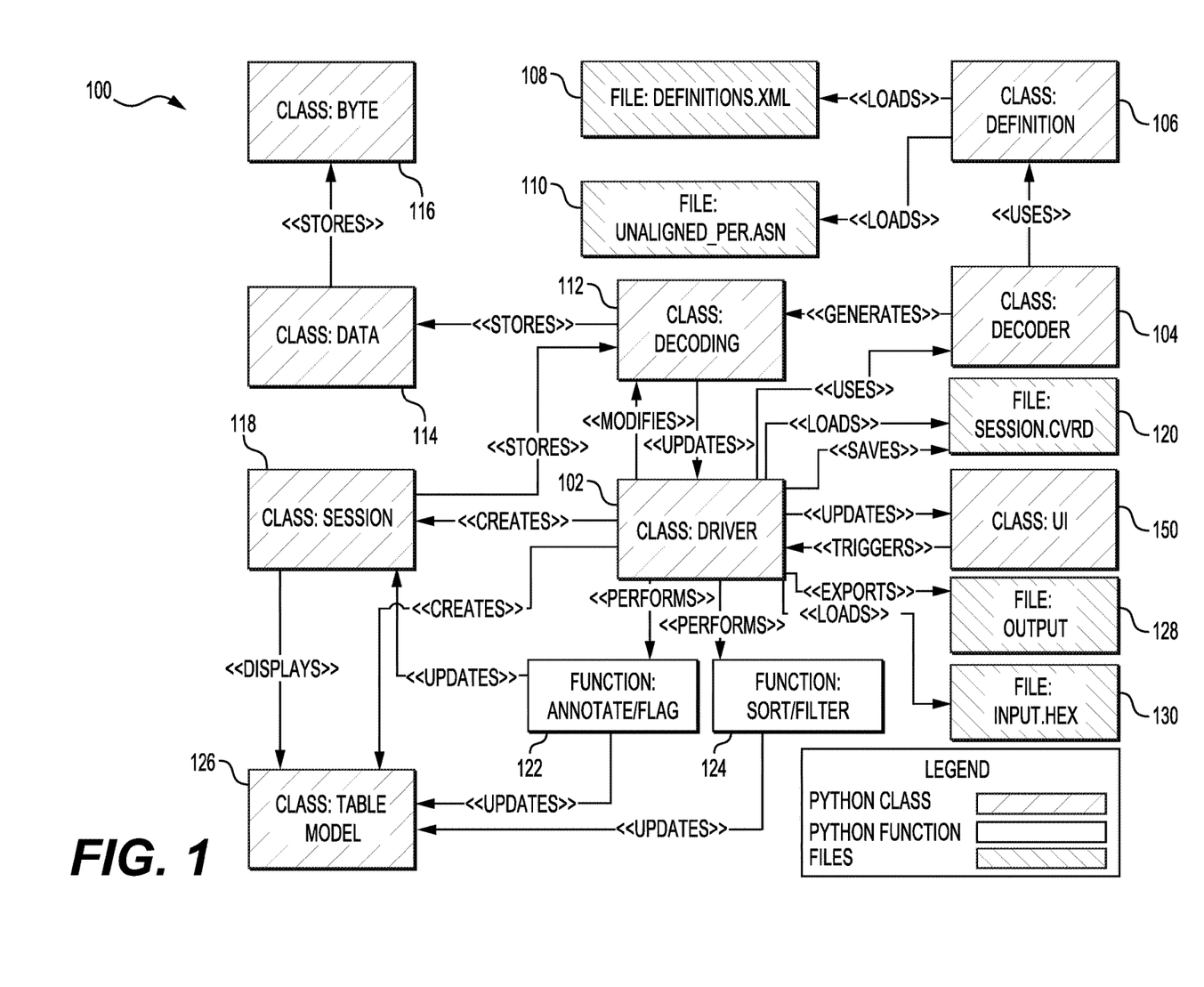
FIG. 1 is a processing system configured to decode CVR encoded data, in some embodiments.

Referring to FIG. 1, an exemplary processing system 100 configured to decode CVR encoded data is illustrated. Processing system 100 comprises distinct classes, as described above, that perform specific functions based on received files and subsequently provides exported files. Processing system 100 comprises a driver class 102. Driver class 102 is responsible for handling communication between a UI class 150 and backend components. For example, as will be discussed in greater detail below in connection with FIG. 2, UI class 150 may trigger the driver class 102 to initiate certain program functions. Furthermore, the driver class 102 may update data displayed to a user interface 200 (see FIG. 2). In some embodiments, upon receiving an initiation command from the user interface 200, the driver class 102 may load a decoder class 104 and a definitions class 106. The definitions class 106 may subsequently load configuration files, such as a definitions file 108 and an unaligned PER data file 110. Such configuration files may comprise instructions on how processing system 100 may proceed during a session of decoding information stored as CVR encoded data.

Based on information loaded by the definitions class 106, the decoder class 104 may generate decoded objects or data to be used in a decoding class 112. The decoding class 112 may store decoded information by using a data class 114 and a byte class 116. Decoded information may be stored in the data class 114 and byte class 116 transiently or permanently. In some embodiments, a user using user interface 200 may instruct the processing system 100 to store the decoded objects for a specified period of time. Additionally, the decoded objects may be transmitted to one or more other computers and/or databases for storage using the systems and methods described below in reference to FIG. 7.

Referring back to the driver class 102, a session class 118 may be created by the driver class 102. The session class 118 may store current user information for the session in which the processing system 100 is used. For example, if a user logs into the processing system 100 for a set period of time, a first session may be created. Once the user has completed the use of the processing system 100, the first session may be closed. Accordingly, if a user subsequently logs into the processing system 100, a second session may be created. Additionally, a user may generate multiple sessions within the same period of use. Furthermore, a user may log out of the processing system 100 under a first session, and correspondingly log back in and continue use within the first session. Subsequent information about the session may be outputted by the driver class 102 as a session file 120. The session file 120 may comprise any decoded objects generated during a specified session.

During a session, the driver class 102 may perform one or both of an annotate/flag function 122 and a sort/filter function 124. When one or both of the annotate/flag function 122 and the sort/filter function 124 are performed, they may update a table model class 126. In some embodiments, one or more of the annotate/flag function 122 and the sort/filter function 124 may be performed based on user input at the user interface 200. Similarly, updating the table model class 126 may update data table 202 displayed on the user interface 200. This will be discussed in greater detail below with reference to FIG. 2.

Figure 2:
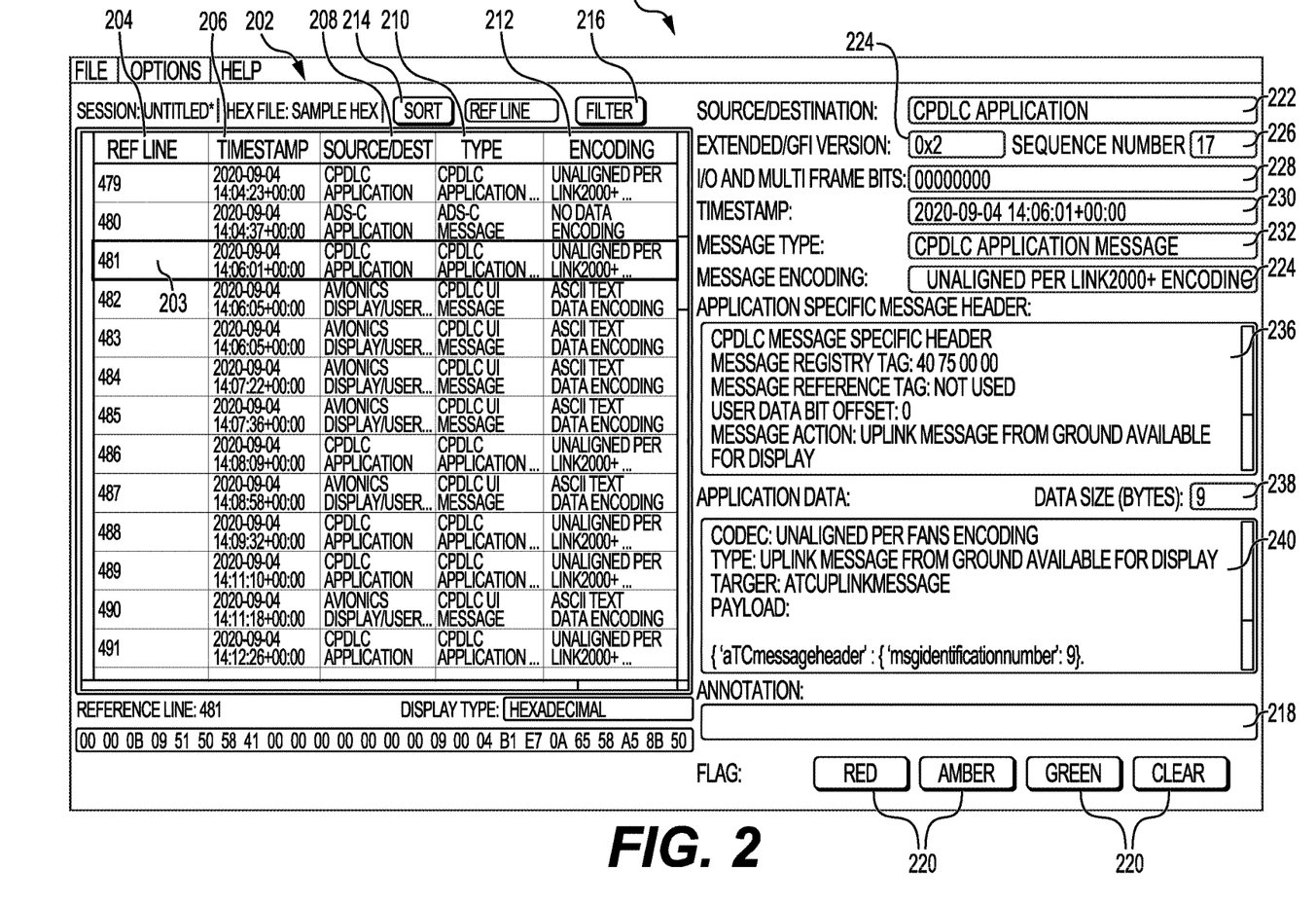
FIG. 2 is a user interface configured to allow a user to use the processing system of FIG. 1, in some embodiments.

The driver class 102 may export an output file 128. In some embodiments, the output file 128 may be exported by the driver class 102 during a session by receiving a signal from the user interface 200. In some embodiments, the output file 128 may be exported by the driver class 102 automatically based on certain predetermined qualifications (e.g., a session has ended, a set of decoded information has been flagged, a data threshold is reached, etc.).

In embodiments, an input file 130 may be received by the driver class 102. For example, a user using the user interface 200 may signal for input file 130 to be received, and subsequently loaded, by the driver class 102. In some embodiments, the input file 130 may be automatically received by the driver class 102 once a certain predetermined qualification is met (e.g., a CVR is connected to the computer, the processing system 100 is opened, etc.).

Referring now to FIG. 2, an exemplary user interface 200 of some embodiments is illustrated. The user interface 200 allows a user to instruct processing system 100 to perform certain functions related to decoding CVR encoded data and subsequently receive decoded objects (i.e., the decoded CVR encoded data) from the processing system 100. The exemplary user interface 200 may include a data table 202 which may list one or more sets of data 203. Data table 202 may be created by the driver class 102 and displayed by the session class 118. Furthermore, the data table 202 may be updated when one or more of the annotate/flag function 122 and the sort/filter function 124 are performed. The data table 202 may list one or more sets of information corresponding with each set of data 203. This may include one or more of a reference line 204, a timestamp 206, a source/destination 208, a message type 210, and an encoding type 212. Additional items shown here on the right side of the user interface 200 will similarly be updated with information regarding the set of data 203, and will be discussed below with reference to FIGS. 4-6.

The set or sets of data 203 within the data table 202 may be altered by the user by selecting either a sort input 214 or a filter input 216. One or both of the sort input 214 and the filter input 216 may instruct the processing system 100 to perform the sort/filter function 124 on the sets of data 203. In some embodiments, the sort input 214 may instruct the driver class 102 to sort one or more data sets 203 displayed in the data table 202 based on a set of specified parameters. For example, the sort input 214 may be used to sort the one or more sets of data 203 in the data table 202 based on the reference line 204, the timestamp 206, the source/destination 208, the type 210, or the encoding type 212. Accordingly, the data table 202 may rearrange the one or more sets of data 203 based on the specified parameters.

In some embodiments, the filter input 216 may instruct the driver class 102 to filter the one or more sets of data 203 displayed in the data table 202 based on a set of specified parameters. For example, the filter input 216 may be used to remove certain sets of data 203 from the data table 202. This may be chosen based on a set of parameters determined by a user. For example, sets of data 203 comprising a timestamp 206 that is before a specified time may be removed from the data table 202.

The user interface 200 may include an annotation field 218 and/or a flag input 220 that instructs driver class 102 to perform the annotate/flag function 122. One or both of the annotation field 218 and the flag input 220 may label one or more sets of data 203 that is selected in the data table 202. For example, a user may, via data table 202, select a specific set of data 203 that is to be annotated or flagged. The user may then, using either the annotation field 218 and/or the flag input 220, label that set of data. Such options may be advantageous to a user if, for example, a set of data 203 comprises specific data relevant to the investigation of the CVR encoded data. Additional fields may be displayed on user interface 200 for receiving user input and/or displaying information. For example, as depicted in the FIG. 2 embodiment, a source/destination field 222, an extended GFI version field 224, a sequence number field 226, a input/output and multiframe bits field 228, a timestamp field 230, a message type field 232, a message encoding field 234, a specific header field 236, a data size field 238, and an application data field 240 are shown. These fields are described below in connection with FIGS. 4-6.

Figure 3:
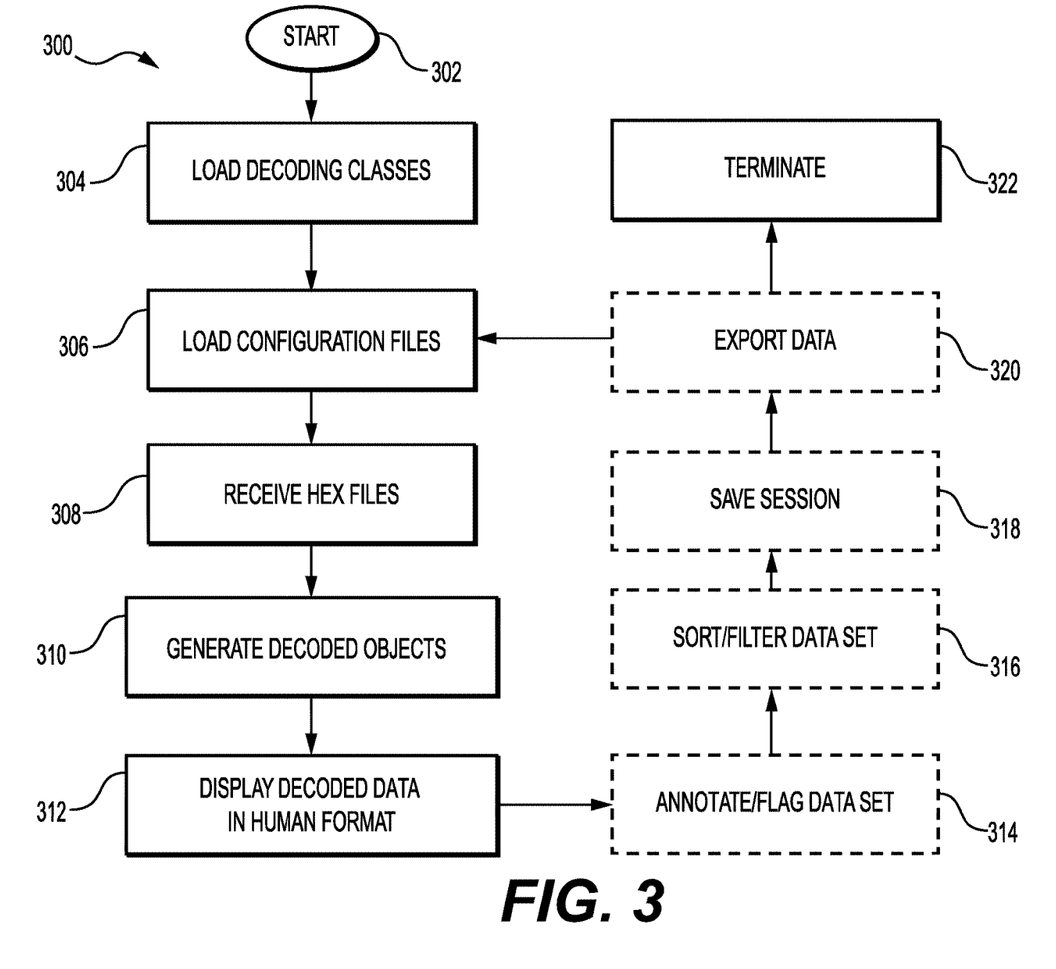
FIG. 3 is a flow diagram illustrating a decoding method, in some embodiments.

With reference to FIG. 3, a decoding method 300 is illustrated. In a step 302, the decoding method 300 starts. In an example of step 302, a user initializes the processing system 100 via a computer (e.g., computer 702 in FIG. 7).

In a step 304, the decoding classes are loaded into a memory (e.g., memories described below in reference to FIG. 7). In an example of step 304, a decoder class (e.g., decoder class 104) and a definition class (e.g., definitions class 106) are loaded by a driver control (e.g., driver class 102). In embodiments, the definitions class 106 comprises a representation of the decoding definitions necessary for the decoder class 104 to decode CVR encoded data.

In a step 306, the configuration files are loaded into the memory. In an example of step 306, the definitions class 106 loads one or both of the definitions file 108 and the unaligned PER data file 110. The loading of these configuration files may allow the decoder class 104 to define the parameters by which to decode CVR encoded data. Notably, these files allow processing system 100 to be configurable based on the structure of the payload. For example, as discussed below, the processing system 100 may be able to determine and decode different structures of payloads (e.g., CPDLC application message, CPDLC application abort message, Link2000+CM application message, Link2000+CM application abort message, CPDLC UI message, Link2000+CM UI message, AFN UI message, ADS-C UI message, ACARS application message, ACARS UI message, AFN message, or ADS-C message).

In a step 308, one or more hex files are received. In an example of step 308, a user may input hex files from a CVR into the processing system 100. Each hex file may comprise encoded CVR encoded data, such as unaligned PER data or other data types as listed below. The one or more hex files is received into the memory and subsequently processed with the following steps.

In a step 310, decoded objects are generated. In an example of step 310, the decoder class 104, using definitions class 106 may generate decoded objects based on the hex file loaded in step 308. In some embodiments, the decoder class 104 decodes CVR encoded data (e.g., unaligned PER data), which is converted into the decoded objects that are stored in the memory. In some embodiments, the decoded objects may be in human readable format. The process of decoding CVR encoded data and generating the decoded objects (i.e., step 310) is explained in greater detail below with reference to FIGS. 4-6.

In a step 312, the decoded objects are displayed in a human readable format. In an example of step 312, the decoded objects from step 310 are displayed via the user interface 200. This may allow a user to investigate one or more sets of data 203. This will be further described below with reference to FIGS. 4-6.

In an optional step 314, one or more sets of data are flagged or annotated. In an example of step 314, a user using user interface 200 may select the flag input 220 to flag one or more sets of data 203. The data 203 may include the decoded objects displayed in human readable format from step 312, for example. The driver class 102 may then perform the annotate/flag function 122 and subsequently update the table model class 126. The flag input 220 may allow for a range of different flags with which to label the one or more sets of data 203. For example, the flag input 220 may comprise different flag labels that indicate the importance of a specific set of data 203. In this example, a user investigating the human readable data from one or more sets of data 203 may determine that a specific set of data 203 comprises pertinent information that may help the investigation. Accordingly, the user may select a high importance flag to label the set of data 203 with. Furthermore, the user may annotate one or more sets of data 203 using the annotate field 218. The driver class 102 may then perform the annotate/flag function 122 and subsequently update the table model class 126. In one example, a user may annotate an important segment of the set of data 203 such that the user may, at a later time, quickly identify the important aspect of the set of data 203.

In an optional step 316, one or more data sets are sorted or filtered. In an example of step 316, a user using user interface 200 may select the sort input 214 to sort the one or more data sets 203. For example, a user may desire to view the one or more data sets 203 based on the timestamp 206 (e.g., in chronological order). In this case, the driver class 102 may perform the sort/filter function 124 and subsequently update the table model class 126 to sort the sets of data 203 in chronological order. In another example of step 316, a user using user interface 200 may select the filter function 124 to filter the one or more sets of data 203. For example, a user may desire to only view the sets of data 203 comprising a timestamp 206 after a specific time. In this case, the driver class 102 may perform the sort/filter function 124 and subsequently update the table model class 126 to filter the data sets 203 to only display the data sets 203 comprising a timestamp 206 after the inputted time.

In an optional step 318, the session may be saved. In an example of step 318, a user may, using user interface 200, save the session. Accordingly, the driver class 102 may save and/or update the session file 120.

In an optional step 320, information regarding one or more sessions may be exported. In an example of step 320, the driver class 102 may export the output file 128. In some embodiments, the output file 128 may be automatically exported by the driver class 102 upon saving the session (i.e., step 318). In some embodiments, a user may indicate to the processing system 100, via user interface 200, to export the output file 128. The output file 128 may comprise information regarding one or more sessions and one or more sets of data 203.

In a step 322, the decoding method 300 may be terminated. In an example of step 322, a user, via user interface 200, may terminate the decoding method 300 by simply closing out the session/app. Optionally, the decoding method 300 may proceed from step 320 to either step 322 or proceed back to step 306. By proceeding back to step 306, the decoding method 300 may again start to decode one or more additional CVR encoded data. Thus, allowing a user to continue using the program for multiple sets of data. Furthermore, a user may upload a previous session to investigate a previously decoded CVR encoded dataset. For example, a user may have previously run a session, which was created by driver class 102 using the session class 118 and saved by driver class 102 using the session file 120. Accordingly, a user may open the session file 120 to continue investigating the previously decoded data using user interface 200.

Figure 4:
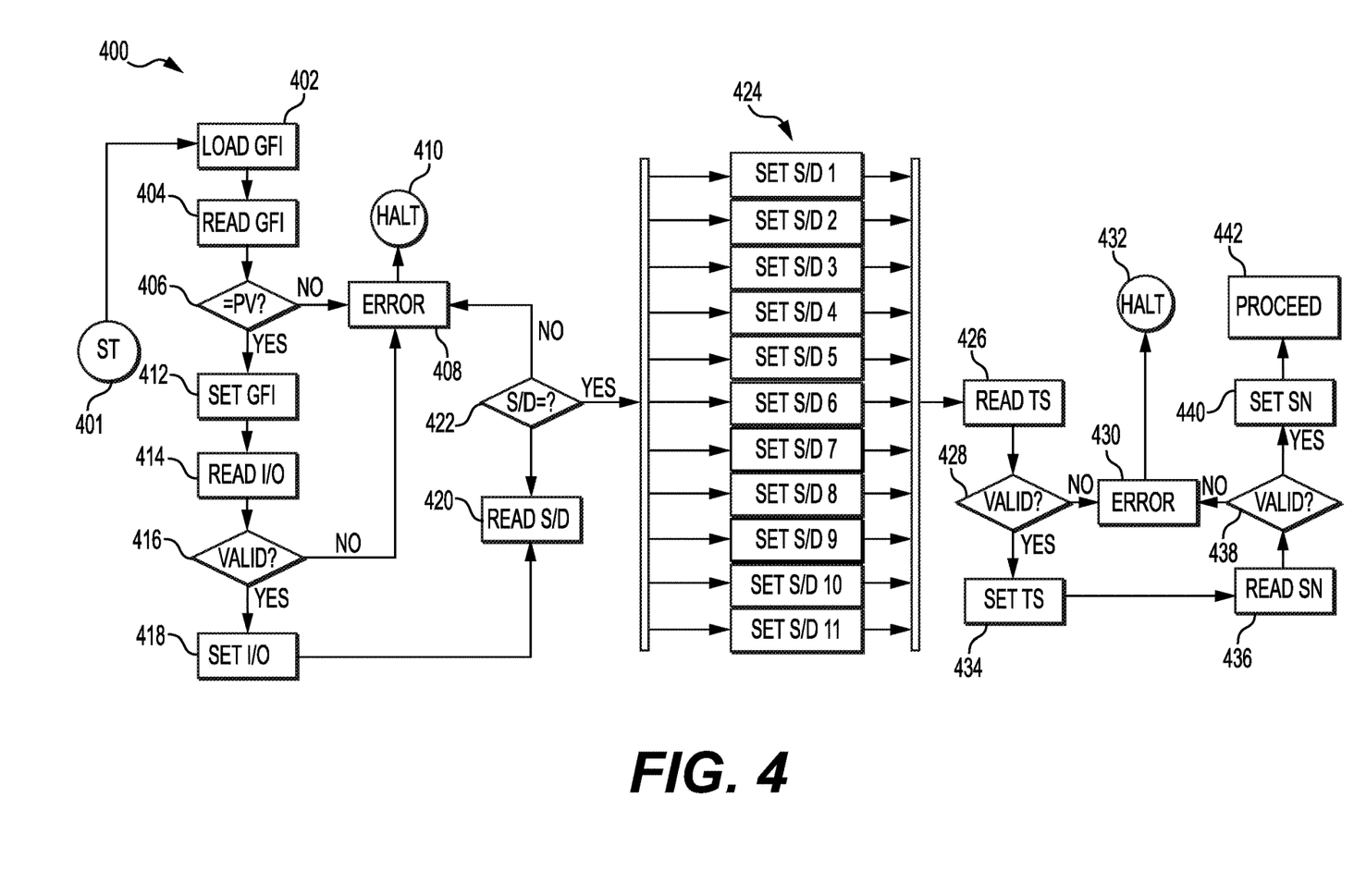
FIG. 4 depicts a flow diagram of a general format identifier (GFI) header method 400, in some embodiments.

FIG. 4 depicts a flow diagram of a general format identifier (GFI) header method 400, in some embodiments. The GFI header method 400 is a portion of the step 310 with reference to FIG. 3. In a step 401, the GFI header method 400 starts. In an example of step 401, a user using user interface 200 instructs the processing system 100 to initiate decoding of a hex file (e.g., input file 130).

In a step 402, the raw data extender GFI header is loaded. In an example of step 402, the processing system (e.g., processing system 100) loads an eight byte GFI header.

In a step 404, the extended GFI version field is read to provide a GFI read value. In an example of step 404, the processing system (e.g., processing system 100) reads the GFI version field. In some embodiments, byte 0 of the eight bytes loaded in step 402 comprises the extended GFI version field.

Step 406 is a decision step. If in step 404, the GFI read value is equal to a predetermined value (PV), then GFI header method proceeds to step 412. If in step 404 the read value does not equal the predetermined value, then GFI proceeds to step 408. For example, if the predetermined value is 0x02, and the read value is 0x02, then method 400 proceeds to step 412. In this example, if the read value is not equal to 0x02 (e.g., 0x08), then method 400 proceeds to step 408.

In a step 408, the decoding error is raised. In an example of step 408, the processing system (e.g., processing system 100) may notify a user of a decoding error using, for example, user interface 200.

In a step 410, the method executes a halt command. In an example of step 410, method 400 is halted and a user is notified.

In a step 412, the extended GFI version is set to a predetermined value. In an example of step 412, the processing system 100 updates the extended GFI version field 224 to indicate it is the predetermined value (e.g., 0x02).

In a step 414, the input/output and multiframe bits (I/O) field is read. In an example of step 414, the processing system (e.g., processing system 100) reads the input/output and multiframe bits field. In some embodiments, the input/output and multiframe bits field comprises byte 1 of the eight bytes loaded in step 402.

Step 416 is a decision. If in step 414 the read value is valid, method 400 proceeds to step 418. If in step 416, the read value is invalid, the method proceeds to step 408.

In a step 418, the input/output and multiframe bits (I/O) value is set. In an example of step 418, the processing system (e.g., processing system 100) sets the input/output and the multiframe bits value based on the read value in step 414, and subsequently updates the input/output and multiframe bits field 228 to reflect the read value from step 414.

In a step 420, the source/destination (S/D) field is read. In an example of step 420, the processing system (e.g., processing system 100) reads the source/destination field to provide a source/destination value. In some embodiments, the source/destination field comprises byte 2 of the eight bytes loaded in step 402.

Step 422 is a decision step. In step 422, the source/destination value from step 420 is read and interpreted. Based on the source/destination value from step 420, method 400 determines which type of source/destination to set. Step 424 depicts some examples of the types of source/destinations method 400 may set.

In a step 424, the source/destination (S/D) is set. Based on the read value from step 420, method 400 determines which type of source/destination application to set. For example, the source/destination application type may be set to one of the following based on the read value in step 420: avionics/display/user interface, CPDLC application, Link2000+CM application, AFN application, ADS-C application, ACARS D-ATIS, ACARS TWIP application, ACARS PCD/DCL application, ACARS OCL application, ACARS Text Weather (METAR, TAF, PIREP, METRO WX, NOT AM) application, or ACARS Flight Plan application. Processing system 100 may subsequently update the source/destination field 222 of the user interface 200.

In a step 426, the timestamp (TS) field is read. In an example of step 426, the processing system (e.g., processing system 100) reads the timestamp field. In some embodiments, bytes 3-6 of the eight bytes loaded in step 420 comprises the timestamp field.

Step 428 is a decision. If in step 426, the read value of the timestamp is invalid then method 400 proceeds to step 430. If in step 426, the read value of the timestamp is valid then method 400 proceeds to step 434.

In a step 430, the decoding error is raised. In an example of step 430, the processing system (e.g., processing system 100) may notify a user of a decoding error using, for example, user interface 200.

In a step 432, the method executes a halt command. In an example of step 432, method 400 is halted and a user is notified.

In a step 434, the timestamp (TS) value is set. In an example of step 434, the processing system (e.g., processing system 100) sets the timestamp based on the read value from step 426. The processing system 100 may subsequently update the timestamp field 230 on the user interface 200 to reflect the read value from step 426.

In a step 436, the sequence number (SN) field is read. In an example of step 436, the processing system (e.g., processing system 100) reads the sequence number field. In some embodiments, byte 7 of the eight bytes loaded in step 402 comprises the sequence number.

Step 438 is a decision. If in step 426, the read value is invalid, then method 400 proceeds to step 430. If in step 426, the read value is valid, then method 400 proceeds to step 440.

In a step 440, the sequence number (SN) is set. In an example of step 440, the processing system (e.g., processing system 100) sets the sequence number read in step 436. The processing system 100 may subsequently update the sequence number field 226 of the user interface 200.

Figure 5:
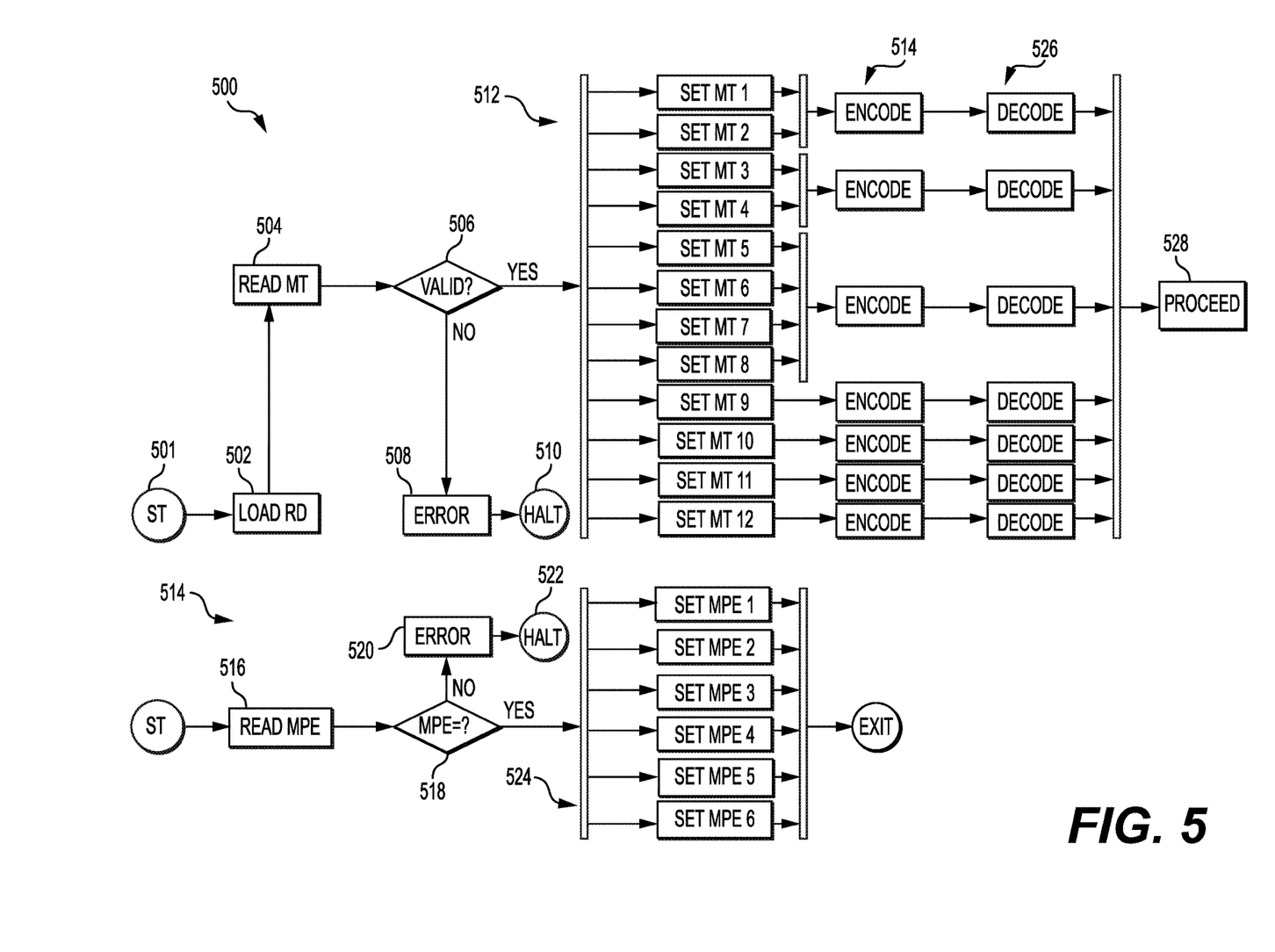
FIG. 5 depicts a flow diagram of a decoding: encoding data method 500, in some embodiments.

In a step 442, method 400 proceeds to a decoding: encoding data method 500. In an example of step 442, the values set by the processing system in method 400 are carried over to method 500. For example, values (extended GFI Version, input/output and multiframe bits, source/destination type, timestamp, and sequence number) set in steps 412, 418, 424, 434, and 440 may be saved by the processing system (e.g., processing system 100) to a memory. Types of memories these values may be saved to are described in greater detail with reference to FIG. 7.

FIG. 5 depicts a flow diagram of the decoding: encoding data method 500, in some embodiments. In a step 501, method 500 starts. In an example of step 501, the processing system 100 automatically begins method 500 following step 442 of method 400.

In a step 502, the raw data (RD) for encoding the data section is loaded. In an example of step 502, the processing system (e.g., processing system 100) loads the raw data, which includes the remaining bytes for encoding the data section. In embodiments, the raw data are the remaining bytes of the CPDLC message including the Message Type field. In some embodiments, the raw data may comprise two bytes.

In a step 504, the message type (MT) field is read. In an example of step 504, the processing system (e.g., processing system 100) reads the message type field. In some embodiments, byte 0 of the two bytes loaded in step 502 comprises the message type field.

Step 506 is a decision step. If in step 504, the read value is invalid, then method 500 proceeds to step 508. For example, if the value of byte 0 does not match a predetermined value to identify the message type, then method 500 proceeds to step 508. If in step 504, the read value is valid (i.e., comprises a predetermined type that matches the message type) then method 500 proceeds to step 512.

In a step 508, the decoding error is raised. In an example of step 508, the processing system (e.g., processing system 100) may notify a user of a decoding error via, for example, user interface 200.

In a step 510, the method executes a halt command. In an example of step 510, method 500 is halted and a user is notified.

In a step 512, the message type (MT) is set. In an example of step 512, the processing system (e.g., processing system 100) sets the message type based on the read value in step 504. The message type may comprise any one of the following: CPDLC application message, CPDLC application abort message, Link2000+CM application message, Link2000+CM application abort message, CPDLC UI message, Link2000+CM UI message, AFN UI message, ADS-C UI message, ACARS application message, ACARS UI message, AFN message, or ADS-C message. The processing system 100 may subsequently update the message type field 232 of the user interface 200 to reflect the read message type from step 504.

In a step 514, the message payload encoding decode sub process is executed. Step 514 is further broken into steps 516-524 shown at the bottom of FIG. 5.

In a step 516, the message payload encoding (MPE) field is read. In an example of step 516, the processing system (e.g., processing system 100) reads the message payload encoding field. In some embodiments, byte 1 of the two bytes loaded in step 502 comprises the message payload encoding field.

Step 518 is a decision step. If in step 516, the read value of the message payload encoding (MPE) field is invalid, then method 500 proceeds to step 520. If in step 516, the value of the message payload encoding field is valid, the method 500 proceeds to step 524.

In a step 520, the decoding error is raised. In an example of step 520, the processing system (e.g., processing system 100) may notify a user of a decoding error using, for example, user interface 200.

In a step 522, the method executes a halt command. In an example of step 522, method 500 is halted and a user is notified of the error.

In a step 524, the message payload encoding (MPE) is set. In an example of step 524, the processing system (e.g., processing system 100) sets the message payload encoding based on the value read in step 516. The message payload encoding may comprise any one of the following: no data encoding, ASCII text encoding, Unaligned PER Link2000+ encoding, CPDLC provider abort encoding, CPDLC user abort encoding, or Unaligned PER FANS encoding. The processing system 100 may subsequently update the message encoding field 234 of the user interface 200 to reflect the read message payload encoding from step 516.

In a step 526, the message/action/application specific header section is decoded. In an example of step 526, based on the message type set in step 512, the processing system (e.g., processing system 100) decodes the message/action/application specific header section. The specific header section that is decoded varies by the message type. The specific header section may comprise any one of the following: CPDLC message, CM message, CPDLC/CM/AFN/ADS-C UI action, ACARS application, ACARS UI action, AFN application, or ADS-C application. The specific header field 236 of the user interface 200 may be updated by processing system 100 to reflect this. In certain embodiments, one or more of the message type set in step 512 and/or the message payload encoding set in step 524 are saved to a memory (e.g., memories described below in reference to FIG. 7) and are used in a decode: application data method 600.

Figure 6:
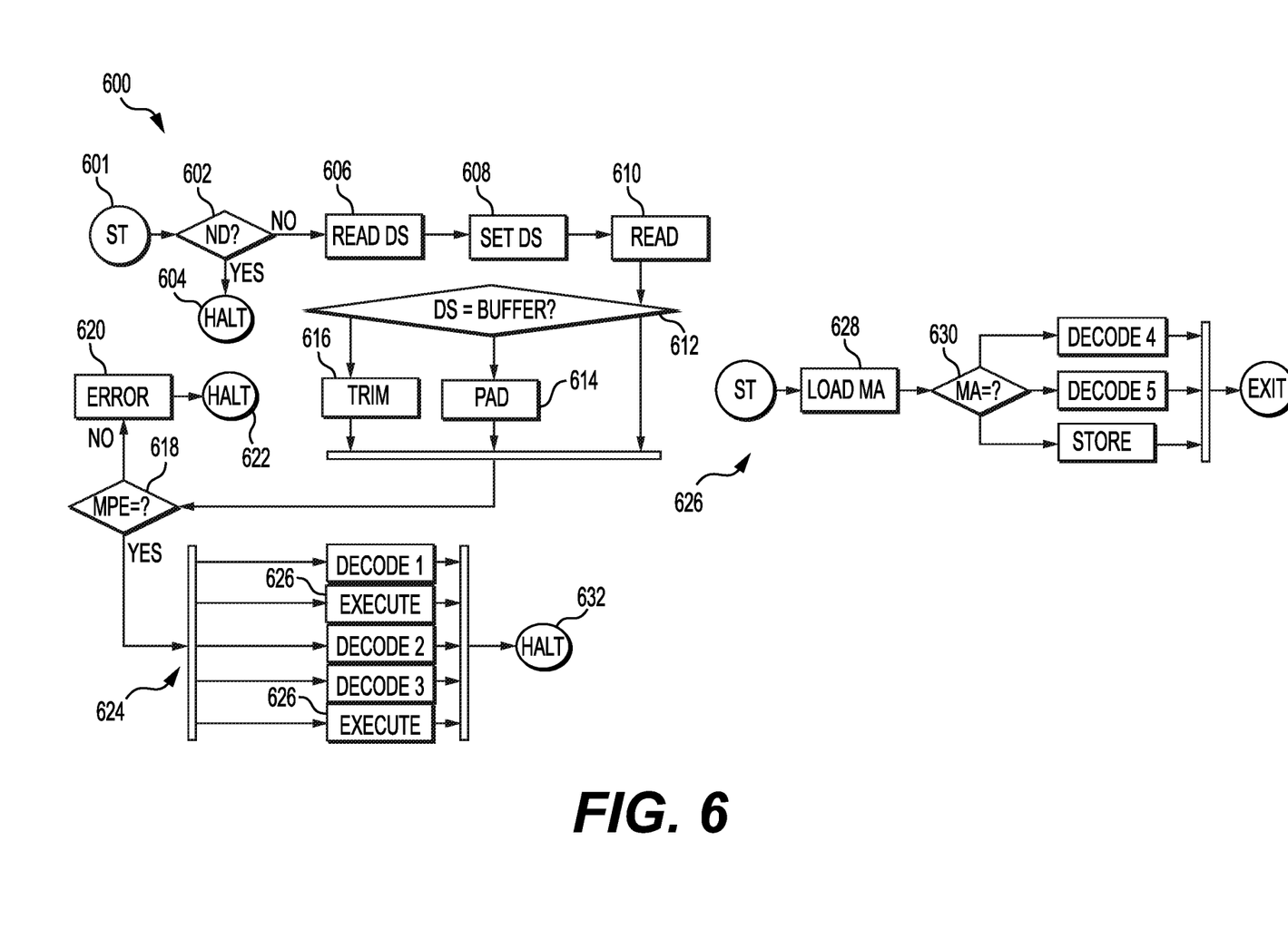
FIG. 6 depicts a flow diagram of the decode: application data method 600, in some embodiments.

FIG. 6 depicts a flow diagram of the decode: application data method 600, in some embodiments. In a step 601, method 600 starts. In an example of step 601, processing system 100 may automatically initiate method 600 following step 528 of method 500.

Step 602 is a decision step. If the message payload encoding set in step 524 is equal to "no data encoding" (ND), then method 600 proceeds to step 604. If the message payload encoding set in step 524 is equal to any other operation other than "no data encoding", then method 600 proceeds to step 606.

In a step 604, method 600 is halted and labeled as a success. In an example of step 604, the processing system (e.g., processing system 100) sets the data type and data to empty. In some embodiments, a user may be notified of step 604 via user interface 200. Processing system 100 may additionally update the specific header field 236 of user interface 200 to reflect this.

In a step 606, the data size (DS) is read. In an example of step 606, the processing system (e.g., processing system 100) reads the data size field. In some embodiments, bytes 0-1 comprise the data size.

In a step 608, the data size (DS) is set. In an example of step 608, the processing system (e.g., processing system 100) sets the data size based on the read value from step 606. The processing system 100 may subsequently update the data size field 238 of the user interface 200 to reflect the read data size from step 606.

In a step 610, the remaining input is read and stored in a buffer. In an example of step 610, the processing system (e.g., processing system 100) reads the input following bytes 0-1. The remaining input is subsequently stored by the processing system 100 in a buffer. The buffer may comprise a memory storage device, such as those described below with reference to FIG. 7. For example, the buffer may comprise random access memory (RAM), such as RAM modules 708.

Step 612 is a decision step to determine if the data size (DS) set in step 608 is less than, equal to, or greater than the buffer. If in step 612, it is determined that the data size is equal to the buffer, then method 600 proceeds with step 618. If in step 612, it is determined that the data size is greater than the buffer, then method 600 proceeds with step 614. If in step 612, it is determined that the data size is less than the buffer, then method 600 proceeds with step 616.

In a step 614, the ends of the buffer are padded with 0's to match the data size. In an example of step 614, the processing system (e.g., processing system 100) pads the ends of the buffer so that the size of the buffer matches that of the data size set in step 608.

In a step 616, the ends of the buffer are truncated to match the data size. In an example of step 616, the processing system (e.g., processing system 100) truncates the ends of the buffer so that the size of the buffer matches that of the data size set in step 608.

Step 618 is a decision step based on the message payload encoding (MPE) determined in step 524. If in step 618, the message payload encoding is determined to be one of ASCII text data encoding, unaligned PER Link2000+encoding, CPDLC provider abort encoding, CPDLC user abort encoding, or Unaligned PER FANS encoding, then method 600 proceeds to step 624. If none of the preceding message payload encoding is determined in step 618, then method 600 proceeds to step 620.

In a step 620, the decoding error is raised. In an example of step 620, the processing system (e.g., processing system 100) may notify a user of a decoding error using, for example, user interface 200.

In a step 622, the method executes a halt command. In an example of step 622, method 600 is halted and a user is notified.

In a step 624, the encoded message is decoded according to the message payload encoding type. In an example of step 624, if the message payload encoding was set at step 524 to ASCII text data encoding, then the processing system (e.g., processing system 100) decodes the read bytes as ASCII and stores the information to data (e.g., data class 114 and byte class 116) (DECODE 1). In another example of step 624, if the message payload encoding was set at step 524 to CPDLC provider abort encoding, then the processing system 100 decodes the read bytes using a CPDLC provider abort encoding lookup table and stores the information to data class 114 and byte class 116 (DECODE 2). In another example of step 624, if the message payload encoding was set at step 524 to CPDLC user abort encoding, then the processing system 100 decodes the read bytes using the CPDLC user abort encoding lookup table and stores the information to data class 114 and byte class 116 (DECODE 3). In other examples of step 624, the information may need to be further decoded. For example, if the message payload encoding was set at step 524 to either Unaligned PER Link2000+encoding or Unaligned PER FANS encoding, then method 600 may proceed with step 626, wherein a decoding sub process is executed.

In a step 628, which is a sub step within step 626, an unaligned PER file is loaded which may determine the message action (MA) associated with the unaligned PER encoded data. In an example of step 628, the processing system 100 loads unaligned PER data file 110. In some embodiments, the type of unaligned PER data file 110 to be loaded may be determined by the MPE determined in step 524. In other words, certain unaligned PER data files 110 may be specific for different types of MPEs. In some embodiments, unaligned PER data file 110 allows processing system 100 to decode unaligned PER data, such as those labeled with the Unaligned PER Link2000+encoding or Unaligned PER FANS encoding message payload encodings.

Step 630 is a decision based on the message action (MA) uploaded from the loaded file in step 628. In an example of step 630, if the message action is "Uplink Message from Ground Available for Display," then the decoder (e.g., decoder class 104) processes the buffer using the ATCUplinkMessage target (DECODE 4). In another example of step 630, if the message action is "Pilot Generated Downlink Message Set," then the decoder class 104 processes the buffer using ATCDownlinkMessage target (DECODE 5). In another example of step 630, if an error is detected (e.g., the message action is not one of the preceding) then a message such as "operation not supported" may be stored in the data class 114.

In a step 632, the decoded information is stored in a data and the method is halted. In an example of step 632, the processing system (e.g., processing system 100) stores the decoded information either from steps 624 or 626 in the data class 114 and the byte class 116. Such a storing of the decoded information may make the information accessible to a user via user interface 200. For example, one or more decoded messages may be displayed in the application data field 240 shown in FIG. 2. Additionally, the decoded information may be stored according to the session (e.g., via session class 118). Furthermore, the decoded information may be exported in an output file 128.

Figure 7:
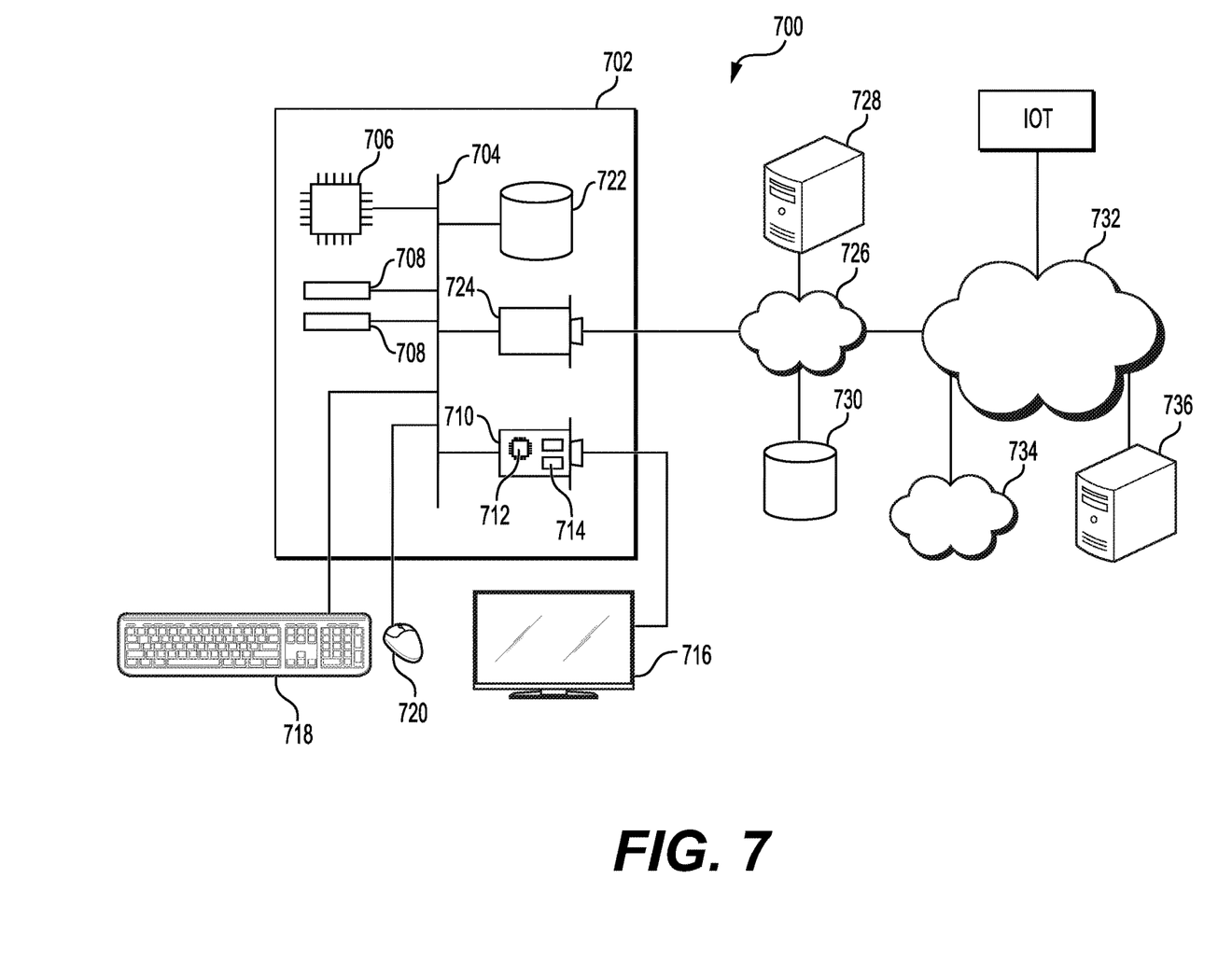
FIG. 7 is a system hardware diagram illustrating the various hardware components for use in connection with systems consistent with the present teachings.

Turning to FIG. 7, the physical hardware that makes up the system will now be discussed. System 700 is depicted as comprising an exemplary hardware platform that can form one element of certain embodiments. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708.

Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction (e.g., user interface 200). In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Finally, network interface card (NIC) 724 is also attached to system bus 704 and allows computer 702 to communicate over a network such as local network 726. NIC 724 can be any form of network interface known in the art, such as Ethernet, ATM, fiber, Bluetooth®, or Wi-Fi (i.e., the IEEE 802.11 family of standards). NIC 724 connects computer 702 to local network 726, which may also include one or more other computers, such as computer 728, and network storage, such as data store 730. Local network 726 is in turn connected to Internet 732, which connects many networks such as local network 726, remote network 734 or directly attached computers such as computer 736. In some embodiments, computer 702 can itself be directly connected to Internet 732.

The computer program of embodiments includes a plurality of code segments executable by a computing device for performing the steps of various methods consistent with the present teachings. The steps of the methods may be performed in the order described, or they may be performed in a different order, unless otherwise expressly stated. Furthermore, some steps may be performed concurrently as opposed to sequentially. Also, some steps may be optional. The computer program may also execute additional steps not described herein. Computer programs, systems, and methods consistent with embodiments of the present disclosure may be implemented in hardware, software, firmware, or combinations thereof using a user inquiry system, which broadly includes server devices, computing devices, and a communications network.

The computer program of embodiments of the present teachings may be responsive to user input (e.g., via user interface 200). As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be non-transitory storage media capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smart phones, smart watches, other smart wearables, and the like, or combinations thereof. Various embodiments of the computing device may also include voice communication devices, such as cell phones and/or smart phones. In some embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments.

In some embodiments, users may be provided with different types of accounts. Each type of account may provide their respective user with unique roles, capabilities, and permissions with respect to implementing certain embodiments. For instance, an investigator may be provided with an investigator account that permits the investigator to access CVR data records that are applicable to an investigation. Additionally, an auditor may be provided with an auditor account that permits the auditor to access CVR data records that are applicable to auditing an investigation. In addition, any number and/or any specific types of accounts is provided as may be necessary to carry out the functions, features, and/or implementations of the present teachings. Upon an investigator, an auditor, or other user logging in to the electronic resource for a first time, the investigator, auditor, or other user may be required to provide various items of identification information to create their respective accounts. Such identification information may include, for instance, personal name, business name, email address, phone number, or the like. Upon providing the identification information, the user may be required to enter (or may be given) a username and password, which may be required to access the electronic resource.

Execution of the computer programs consistent with the present teachings performs steps of the method of certain embodiments. Because many data sets may be decoded at one time, therein requiring updating of the information stored, displayed, and acted upon by the computer program, information displayed by the computer program is displayed in real-time. "Real-time" as defined herein is when the CPU 706 of the system 700 performs the steps less than every 1 second, every 500 milliseconds, every 100 milliseconds, or every 16 milliseconds.

Methods for decoding CVR encoded data broadly include the following actions: loading decoding classes, loading configuration files, receiving hex files, generating decoded objects, displaying the decoded objects in a human readable format. The decoded objects may be kept for internal purposes or shared with others. For example, computer 702 may receive the generate the decoded objects and send the decoded objects to another investigator (e.g., computer 736) through internet 732. Computer 702 may also make the decoded objects readily available to other computers (e.g., computer 728 and computer 736) via networks (e.g., local network 726 and internet 732). In this way, others may view the decoded objects.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A processing method configured to automatically decode aircraft Cockpit Voice Recorder (CVR) encoded data, comprising:
   loading, via a processor, a definitions class and a decoder class into a memory via a driver class, wherein the memory comprises non-transitory computer readable storage medium operatively coupled with the processor;
   loading configuration files into the memory via the definitions class, wherein the configuration files comprise a definitions file and an unaligned packed encoding rules (PER) data file;
   receiving from an aircraft CVR one or more hex files into the memory, wherein the one or more hex files comprise CVR encoded data;
   generating via the decoder class and the configurations file one or more decoded objects based on the one or more hex files, respectively, comprising:
      loading a raw data extender general format identifier (GFI) header; and
      reading an extended GFI version field to provide a GFI read value; and
   displaying, via a user interface operatively coupled with the processor, the one or more decoded objects in a human readable format, and when the GFI read value equals a predetermined value, updating the extended GFI version field on the user interface to the predetermined value.

2. The processing method of claim 1, comprising annotating the one or more decoded objects.

3. The processing method of claim 1, comprising flagging the one or more decoded objects.

4. The processing method of claim 1, comprising sorting the one or more decoded objects.

5. The processing method of claim 1, comprising filtering the one or more decoded objects.

6. The processing method of claim 1, further comprising:
   reading an input/output (I/O) and multiframe bits field to provide an I/O read value and determining whether the I/O read value is valid; and
   when the I/O read value is valid, setting the I/O and multiframe bits field to the I/O read value.

7. The processing method of claim 6, further comprising reading a source/destination field to provide a source/destination value, and setting a source/destination location based on the source/destination value.

8. The processing method of claim 7, further comprising:
   reading a timestamp field to provide a timestamp read value and determining whether the timestamp read value is valid; and
   when the timestamp read value is valid, setting a timestamp value based on the timestamp read value.

9. The processing method of claim 8, further comprising:
   reading a sequence number value to provide a sequence number read value and determining whether the sequence number read value is valid; and
   when the sequence number read value is valid, setting a sequence number value based on the sequence number read value.

10. The processing method of claim 9, further comprising:
    reading a message type field and determining whether the message type matches a predetermined type;
    when the message type matches the predetermined type, reading a message payload encoding field and determining whether a value of the message payload encoding field is valid;
    when the value of the message payload encoding field is valid, setting the message payload encoding field to the value; and
    decoding a specific header section based on the message type.

11. The processing method of claim 10, further comprising:
    when the value of the message payload encoding field is not set to no data encoding, reading a data size;
    reading a remaining input and storing the remaining input in a buffer memory;
    when the data size is greater than the buffer memory, padding the buffer memory to match the data size;
    when the data size is less than the buffer memory, truncating the buffer memory to match the data size; and
    when the value of the message payload encoding field is set to no data encoding, halting the method.

12. The processing method of claim 11, further comprising:
    decoding the encoded message according to the message payload encoding type;
    storing a decoded message in a data class; and
    making the decoded message accessible to a user via the user interface.

13. A processing system configured to automatically decode aircraft Cockpit Voice Recorder (CVR) encoded data, comprising:
    a user interface;

a processor operatively coupled to the user interface; and
a memory operatively coupled to the processor, wherein the memory has a computer program stored thereon, the computer program being configured to decode CVR encoded data via the steps of:
  loading decoding classes via a driver class, wherein the decoding classes comprise a definitions class and a decoder class;
  loading, via the definitions class, configuration files, wherein the configuration files comprise a definitions file and an unaligned packed encoding rules (PER) data file, wherein the decoder class is configured to define parameters by which to decode the CVR encoded data;
  receiving one or more hex files comprising the CVR encoded data;
  generating, via the decoder class and the configuration files, one or more decoded objects based on the one or more hex files, respectively, comprising:
    loading a raw data extender general format identifier (GFI) header; and
    reading an extended GFI version field to provide a GFI read value; and
  displaying, via the user interface, the one or more decoded objects in a human readable format, and when the GFI read value equals a predetermined value, updating the extended GFI version field on the user interface to the predetermined value.

14. The processing system of claim 13, wherein the user interface comprises a data table configured to list one or more sets of data.

15. The processing system of claim 14, wherein the data table is configured to list one or more of a reference line, a timestamp, a source/destination location, a message type, and an encoding type.

16. The processing system of claim 13, wherein the user interface comprises a sort input configured to receive a sorting instructions for the processor to sort sets of data.

17. The processing system of claim 13, wherein the user interface comprises a filter input configured to receive filtering instructions for the processor to filter sets of data.

18. The processing system of claim 13, wherein the user interface comprises an annotation field configured to receive an annotation input for instructing the processor to annotate one or more sets of data.

19. The processing system of claim 13, wherein the user interface comprises a flag input configured to flagging instructions for the processor to flag one or more sets of data.

* * * * *